Oct. 12, 1937.　　　　J. L. FINCH　　　　2,095,383
AUTOMATIC TEMPERATURE CONTROL
Original Filed Dec. 13, 1934
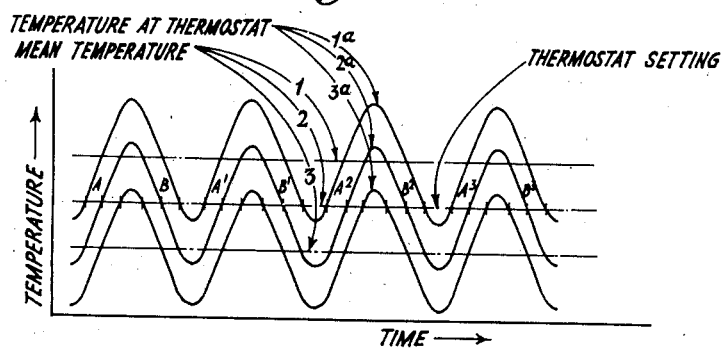
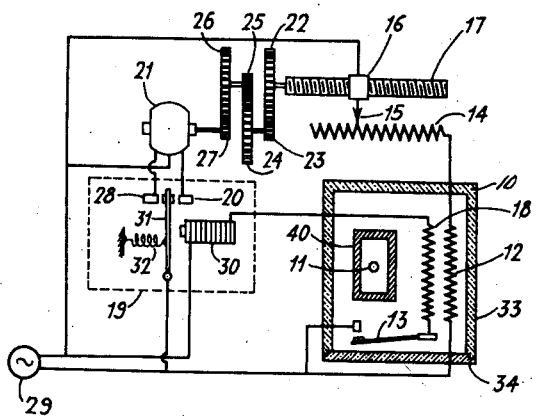
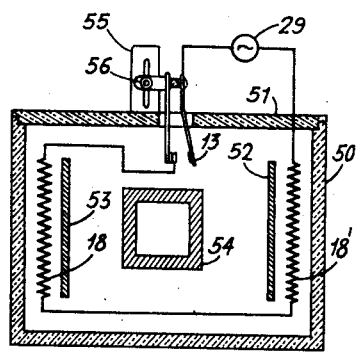
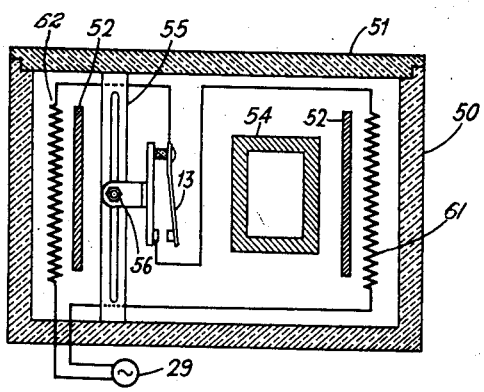
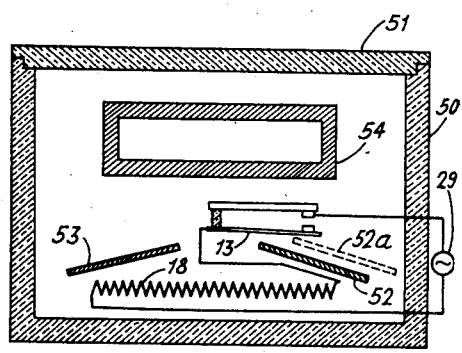
INVENTOR
JAMES L. FINCH
BY
ATTORNEY Patented Oct. 12, 1937

2,095,383

UNITED STATES PATENT OFFICE 2,095,383

AUTOMATIC TEMPERATURE CONTROL

James L. Finch, Patchogue, N. Y., assignor to Radio Corporation of America, a corporation of Delaware Original application December 13, 1934, Serial No. 757,326. Divided and this application October 5, 1935, Serial No. 43,653

6 Claims. (Cl. 219—20)

This invention relates to improvements in automatic temperature control apparatus, and more particularly to the automatic temperature control of an oven or casing enclosing a piezo-electric crystal.

This application is a division of my copending application, Serial No. 757,326, filed December 13, 1934.

An object of this invention is to simplify and improve the controlling of the temperature of a container for piezo-electric crystals for use in commercial short-wave circuits.

Another object of this invention is to provide a novel method of heating the piezo-electric crystal oven or its enclosing chamber by means of electrical heating units which are externally controlled so that the heater is on a portion of the time and off a portion of the time.

Another object of this invention is to provide an automatic temperature control device wherein the elements employed for the temperature control of the heat within the oven are arranged to be controlled extremely accurately.

A feature of this invention is the means for adjustment of the oven temperature control so as to compensate for any effects encountered due to a particular set-up of an oven manufactured for the average temperature conditions.

Another feature of this invention is the location of a thermostatic element nearest the warmest stratum in the oven and the provision for exposing a part of it or all of it to a partial degree to the ambient temperature, this exposure being adjusted manually.

Another feature of this invention is the mounting of the thermostatic element so that its position can be manually adjusted to expose it to any desired stratum within the casing.

This invention is particularly adapted to the automatic temperature control of an oven which is employed for various scientific and engineering purposes, wherein it is desirable to hold the temperature of a certain body accurately. The temperature to be controlled may be either above or below the ambient temperature. When the temperature desired is to be held above the ambient temperature, heat is supplied to the oven, while on the other hand, when it is desired that the temperature to be controlled is to be kept below the ambient temperature, then heat must be carried away from the interior of the oven. In this latter case some cold fluid is required to carry away the heat within the oven. The modification covered by my invention as disclosed in the following description, is particularly adapted to the case where the temperature required is to be maintained above the ambient temperature, but it is to be distinctly understood that this description with obvious modifications would apply equally well for the case where heat is to be extracted from the interior of the oven.

The source of heat which I prefer to employ is that of an electrical source which may be of any suitable form such as an alternating current supply source or a direct current source. The electrical source is then connected through various controlled elements to two or more heating units contained within the casing which may be of any suitable form such as a heating element made up of a winding of resistance wire or the like. In the temperature controlled oven the heat generated within is transferred from the point of generation to the walls of the oven to supply the heat losses. This heat is transferred by conduction or convection. Some heat may also be transferred by radiation but this latter factor is usually negligible. The medium within the oven may be a solid or fluid and when fluid it may be circulated by natural or artificial means. The principle outlined in the following applies in all these cases. The temperature control is effected by means of a thermostatic unit placed within the oven and adjacent to the body to be controlled. This thermostatic unit may control all of the heat by turning it completely on when the temperature is below the setting of the thermostatic unit, and completely shutting off the heating element when it is above the thermostatic setting, or a part of the heat may be supplied with such thermostat control and the remainder with manual control arrangements only. The body or piezo-electric crystal whose surrounding temperature is to be regulated, may have sufficient heat storage to smooth out the variations to a negligible value, or it may be installed within a shield or oven to assist in the smoothing out. The body or piezo-electric crystal itself would then hold a temperature equal to the average temperature to which it is subjected.

The specific features of this invention will probably best be understood by referring to the accompanying drawing, in which, Fig. 1 is a graphic representation of the various temperature curves;

Fig. 2 is a diagrammatic arrangement of the apparatus and circuit employed in my invention;

Fig. 3 is a casing having baffles to improve the fluid circulation, and having an external thermostatic element which can be manually adjusted:

Fig. 4 is a casing similar to Fig. 2 except that the heating element is not subdivided;

Fig. 5 is another modification similar to Figs. 2 and 3, except that the thermostat element is arranged to be moved in various positions within the casing.

Referring now to Fig. 1, the three parallel horizontal lines 1, 2, and 3 represent the mean temperatures wherein the center line 2 represents the thermostatic setting and is plotted against time. When the heat generated within the oven is set at a particular value for a given ambient temperature, sufficient that the controlled heat is on just half the time and off half the time, then the average temperature will equal the temperature at which the thermostat is set as is represented by curve $2_a$. The points A, $A^1$, $A^2$ indicate when the thermostat turns the heat off and points B, $B^1$, and $B^2$ indicate when the thermostat turns the heat on. In curve $2_a$ the time AB is equal to time $BA^1$ and time $B^1A^2$, etc.

Curves $1_a$ and $3_a$ also show the condition with the thermostat set the same as in 2 but with such relation between the heat generated and the ambient temperature that in the curve $1_a$ the heat is on a relatively small part of the time and in the curve $3_a$ when it is on a relatively large part of the time. The cyclic changes shown in these curves are due to the over-travel which is due to a lag in the heat transfer caused by the limited conductivity and the heat storage capacity of the elements. It will be noted that for the same thermostat setting the mean temperature is higher for curve $1_a$ than for curve $2_a$, and lower for curve $3_a$ than for curve $2_a$. Curve $1_a$ represents the condition when the ambient temperature is high and curve $3_a$ represents the condition when it is low. Thus, it will be seen that the mean temperature rises and falls with the ambient temperature. This effect is made minimum by cutting down the heat lag as much as possible. It will be seen, from a careful study of the curves, that if the heat could be generated at all points on the surface of the oven in proportion to that required to make up the heat losses from these points, the inside temperature would be uniform throughout. However, it is impractical to accomplish this and therefore some points inside the oven are hotter than others in order that the heat may be transferred from the points of excessive heat to the points where the heat is not sufficient. Thus, there are strata within the casing or enclosing chamber of different temperature levels. The thermostat will assume a temperature equal to that of the stratum in which it is located. Then the temperature of this stratum will follow the curves shown in Fig. 1. When the ambient temperature drops then more heat is required to maintain the oven temperature. Therefore, there will be more difference in the temperature within the casing or container. Thus, all points which are warmer than the stratum to which the thermostat responds will rise in temperature, while those which are cooler will fall in temperature. If the piezoelectric crystal or body whose temperature is to be controlled is exposed to a stratum whose mean temperature is cooler than the thermostat, then its temperature drops with the ambient temperature. However, if the body is warmer, then its temperature rises when the ambient temperature falls. Thus it is apparent that if the body to be regulated is placed in contact with a stratum sufficiently warmer than the thermostat, its temperature variation with the ambient temperature can be made to just compensate for the effects of a time lag in the heat transfer shown in Fig. 1.

Referring now to the apparatus arrangement shown in Fig. 2, wherein one phase or modification of my invention is illustrated and relates to the control of the percent. of time that the heat is on and that it is off, this is accomplished by means of an automatic adjustment either of the amount of heat controlled by the thermostat or the amount of heat which is on steady and not controlled by the thermostat. This arrangement is so adjusted that the heat is on half the time and off half the time. A simple casing or chamber 10 having contained therein an oven 40 for enclosing a piezo-electric crystal 11 and two electrical heater units, the primary heater unit 12 which furnishes a steady heat is not controlled by the thermostatic unit 13 but is controlled by the setting of the variable resistance 14 which has a variable contacting element or slider 15, the movement of which is controlled by the nut 16 cooperating with the threaded worm gear 17. The thermostat 13 which is located within the casing controls the current and therefore the heat in the secondary heater 18. This current also actuates a relay 19 which is located outside of the casing 10. When this current is on, relay 19 closes a right hand contact 20 which drives the motor 21 in a particular direction. The motor 21 is adapted to move the slider 15 of the resistance 14 by means of the threaded worm gear or screw 17 and train of gears comprising gears 22, 23, 24, 25, 26, and 27 so as to increase the heat which is liberated by the primary heater 12. When the thermostat 13 is open the relay 19 closes the left hand contact 28, and the motor 21 then turns in the opposite direction tending to decrease the heat in the primary heater 12. The speed of the motor and the arrangement of the ratio of the train of gears is such that the sliding action of the slider 15 will be relatively slow. When the heat supplied in the casing 10 is such that the thermostat is on exactly half the time, then the travel of the slider is negligible. When conditions are such that the thermostat 13 is on more than half the time, then the average travel of the slider is such as to decrease the heat in the primary heater 12 and therefore requires that the thermostat be on a lower percent. of the time to correct the condition initially assumed. In this way the thermostat keeps the heat supplied by the secondary heater 18 on half the time and off half the time.

The source of electric current is supplied from any suitable source, such as an alternating current generator 29, and is arranged in a circuit in such a manner that it is always capable of supplying heat directly to the primary heater 12. The motor 21 is connected in series between the source of current 29 and the relay 19. The secondary heater 18 is connected in series from the current source with the thermostat 13 and a winding 30 of the relay 19 which, when energized, draws the armature 31 in a position to make contact with the right hand contact 20 and rotate the motor 21 in a particular direction. When the relay winding 30 is not energized, the spring 32 draws the armature 31 to a position to make contact with the left hand contact 28, thus driving it in the opposite direction.

The walls of the casing 10 are insulated from the ambient temperature by any suitable insulating material, as indicated by 33, and means, not shown, such as a suitable adjustable shelf arrangement whereby by opening the door 34 the body 11 and the heating elements 12 and 18 are moved to different levels within the casing 10 to expose the body of the piezo-electric crystal 11 to any desired heat stratum within the casing.

My invention also provides a means for accomplishing the above relationship and also for the adjustment of this relationship to take into account variations which may be caused by placing the oven in different locations and subjecting it to different conditions. This is accomplished by one or any combination of the following:

First, by locating the thermostat near the warmest stratum in the oven and making provision for exposing a part of it or all of it to a partial degree to the ambient temperature, such exposure being manually adjustable, as is illustrated by Fig. 3, wherein 50 is a casing made of insulating material with a cover or door 51. 52 and 53 are baffles conveniently located within the casing to improve the circulation of the fluid within the casing. 54 represents the crystal oven or any conducting member enclosing the crystal when this temperature control device is to be used for temperature control of a crystal. A heating element 18 and 18' is divided into two parts, each of the parts being located on each side of the casing as shown. Heating current is supplied by a suitable generator 29, the current of which is interrupted by the bimetallic thermostat unit 13. This thermostat is exposed partly to air in the top of the casing and partly to air within the casing. Its relative exposure to these two atmospheres can be adjusted by loosening the screw 56 from guide 55 and then moving the thermostat unit in or out. Thus, a position can be found wherein the temperature of element 54 remains constant regardless of the variations in the ambient temperature.

Second, mounting the thermostat so its position can be manually adjusted to expose it to any desired stratum within the oven, as illustrated by Fig. 4, which shows a modification similar to that of Fig. 2, except that a single heating unit is provided and the thermostat unit 13 is arranged within the casing and is adjustable in position so as to expose it to various temperature strata within the casing, and as mentioned above, a particular location of the thermostat unit can be found at which the temperature of the oven 54 will remain substantially constant despite variations in the ambient temperature.

Third, mounting of the thermostat element with adjustable baffles as shown by the dash lines 52a in Fig. 4, fins or heat-conducting elements which are arranged to give the effect of exposing the thermostat to any desired stratum within the casing.

Provision is made for altering the distribution of the generated heat controlled by the thermostat by changing the position of the heating and control elements in the heat stratum within the casing, thus allowing the thermostat to be located in any desired stratum. For example, this may be accomplished by locating two sets of heater wires in different parts of the box to be controlled by the thermostat but so arranged that the relative heat in the two heating elements can be varied. Fig. 5 shows such a modification as is mentioned above and is similar to the modification shown in Fig. 4, except that the heating element is divided into two portions 61 and 62. The relative heat in these two portions is controlled by the apparatus arrangement shown in Fig. 2 wherein the position of slider 15 on the resistance 14 is varied. The thermostat unit 13 is located on guide member 55 so as to be exposed to the heated air rising from the heater 62. If all the heat were generated in heater 62 and none in heater 61, the temperature would be in the hottest part of the casing and the temperature of oven 54 would vary in direct proportion to the ambient temperature variation. If all the heat were concentrated in heater 61, the thermostat unit would be in the coldest portion of the casing and the temperature of oven 54 would vary inversely with the ambient temperature. A particular adjustment of slider 15 can be found at which the temperature of oven 54 remains constant regardless of the ambient temperature.

While this invention has been described and illustrated showing certain modifications, it is to be distinctly understood that this invention is not to be limited except to those limitations which are clearly imposed by the appended claims.

I claim:

1. An automatic temperature control device comprising a casing, an oven within said casing containing an element whose temperature is to be maintained constant, means for maintaining constant temperature within said oven, said means comprising a pair of heating elements and a thermostat located within said casing, external means for controlling the heat within said oven from an electrical supply source, said heating elements and said thermostat being located within said oven so that the heat is on substantially half the time and off half the time within a given time interval, said external means comprising a reversible motor, a variable resistance, a train of gears, a relay having a winding and a spring, an armature and a pair of contacts, the position of the relay armature controlled by said relay winding and said spring so as to control the direction of rotation of said reversible motor, said variable resistance varied by means of the direction of said motor, the winding of said relay connected in series with at least one of said heating elements and said thermostat so as to energize the winding of said relay and rotate said motor in one direction, the spring of said relay closing said contacts to rotate the motor in the opposite direction so as to change the heat supplied to the other heating unit.

2. An automatic temperature control device comprising a casing, an oven containing an element whose temperature is to be maintained constant, a thermostatic element within said oven, said thermostatic element having electrical contacts and arranged to break an electrical circuit, a primary and secondary heating element within said casing, a source of electric current supply, a reversible motor outside of said casing, a train of gears driven by said motor, a variable resistance having a variable contact controlled by said train of gears, a relay outside of said oven, said relay connected in series with said secondary heater and said thermostatic element, the primary heater being controlled by the position of the variable contact on said variable resistance.

3. An automatic temperature control device comprising an enclosed chamber, an element whose temperature is to be maintained constant located within said enclosed chamber, means for maintaining the heat in said chamber constant, said means comprising a thermostatic element located adjacent said element whose temperature is to be maintained constant, a primary and secondary heating unit within said chamber, a relay located outside of said chamber having a winding for controlling the position of a pair of contacts, the winding of said relay being energized by a contact on said thermostat, a reversible motor connected to the contacts of said relay for reversing the direction of rotation, a variable resistance having a variable contact varied by said motor, and means for reversing the direction of said motor by the contacts of said relay to vary the heat in said primary resistance, and a connection from said secondary heating means to said relay and said thermostatic element.

4. An automatic temperature control device comprising an enclosed chamber, an element whose temperature is to be maintained constant located within said enclosed chamber, means for maintaining the heat in said chamber constant, said means comprising a thermostatic element located adjacent said element whose temperature is to be maintained constant, a primary and secondary heating unit within said chamber, a relay located outside of said chamber having a winding for controlling the position of a pair of contacts, the winding of said relay being energized by a contact on said thermostat, a reversible motor connected to the contacts of said relay for reversing the direction of rotation, a variable resistance having a variable contact varied by said motor, and gearing means for reversing the direction of said motor by the contacts of said relay to vary the heat in said primary resistance, and a connection from said secondary heating means to said relay and said thermostatic element.

5. An automatic temperature control device comprising an enclosed chamber, an element whose temperature is to be maintained constant located within said enclosed chamber, means for maintaining the heat in said chamber constant, said means comprising a thermostatic element located adjacent said element whose temperature is to be maintained constant, a primary and secondary heating unit within said chamber, a relay located outside of said chamber having a winding for controlling the position of a pair of contacts, the winding of said relay being energized by contacts on said thermostat, a reversible motor connected to the contacts of said relay for reversing the direction of rotation, a variable resistance having a variable contact varied by said motor, and a train of gears including a worm gear for varying the heat in said primary resistance, and connections from said secondary heating means to said relay and said thermostatic element.

6. An automatic temperature control device comprising an enclosed chamber, an element whose temperature is to be maintained constant located within said enclosed chamber, means for maintaining the heat in said chamber constant, said means comprising a thermostatic element located adjacent said element whose temperature is to be maintained constant, a primary and secondary heating unit within said chamber, a relay located outside of said chamber having a winding for controlling the position of a pair of contacts, the winding of said relay being energized by a contact on said thermostat, a reversible motor connected to the contacts of said relay for reversing the direction of rotation, a variable resistance having a variable contact arranged with a threaded worm gear for slowly changing the position of said variable contact so as to change the heat of said primary heating unit, and means for reversing the direction of said motor by contacts on said relay so as to change the heat of said primary heating unit, and connections from said secondary heating means to said relay and said thermostatic element.

JAMES L. FINCH.